US012777332B2

(12) United States Patent
Chu et al.

(10) Patent No.: US 12,777,332 B2
(45) Date of Patent: Oct. 27, 2026

(54) SYSTEM AND METHOD FOR FRAME PROTECTION

(71) Applicant: NXP USA, Inc., Austin, TX (US)

(72) Inventors: Liwen Chu, San Ramon, CA (US); Kiseon Ryu, San Diego, CA (US); Huizhao Wang, San Jose, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 30 days.

(21) Appl. No.: 18/440,687

(22) Filed: Feb. 13, 2024

(65) Prior Publication Data

US 2024/0276223 A1 Aug. 15, 2024

Related U.S. Application Data

(60) Provisional application No. 63/487,722, filed on Mar. 1, 2023, provisional application No. 63/485,036, filed on Feb. 15, 2023.

(51) Int. Cl.
*H04W 12/106* (2021.01)
*H04W 12/0433* (2021.01)

(52) U.S. Cl.
CPC ..... *H04W 12/106* (2021.01); *H04W 12/0433* (2021.01)

(58) Field of Classification Search
CPC ........................ H04W 12/106; H04W 12/0433
See application file for complete search history.

(56) References Cited

U.S. PATENT DOCUMENTS

| | | | | |
|---|---|---|---|---|
| 10,104,553 | B2 * | 10/2018 | Wentink | H04W 52/54 |
| 11,558,750 | B2 * | 1/2023 | Huang | H04W 12/06 |
| 11,765,779 | B2 * | 9/2023 | Ho | H04W 80/02 |
| 11,800,445 | B2 * | 10/2023 | Chu | H04W 52/0216 |
| 11,812,257 | B2 * | 11/2023 | Ho | H04W 12/03 |
| 12,212,970 | B2 * | 1/2025 | Huang | H04W 12/55 |
| 2020/0092079 | A1 * | 3/2020 | Bayley | H03M 13/09 |
| 2020/0267541 | A1 * | 8/2020 | Huang | H04W 12/10 |
| 2021/0050999 | A1 * | 2/2021 | Huang | H04L 9/088 |
| 2021/0100051 | A1 * | 4/2021 | Ho | H04W 12/033 |
| 2021/0282007 | A1 * | 9/2021 | Ho | H04W 12/041 |
| 2021/0352474 | A1 * | 11/2021 | Bajko | H04W 12/06 |
| 2021/0368322 | A1 * | 11/2021 | Seok | H04W 12/041 |
| 2023/0049552 | A1 * | 2/2023 | Chitrakar | H04W 76/15 |
| 2023/0125787 | A1 * | 4/2023 | Huang | H04W 72/20 370/389 |
| 2023/0171601 | A1 * | 6/2023 | Guo | H04W 12/037 726/4 |
| 2023/0224710 | A1 * | 7/2023 | Huang | H04W 12/06 726/5 |
| 2023/0232218 | A1 * | 7/2023 | Kneckt | H04W 12/02 455/410 |
| 2023/0308227 | A1 * | 9/2023 | Sugaya | H04L 1/1887 |
| 2024/0422780 | A1 | 12/2024 | Chu et al. | |
| 2025/0047413 | A1 | 2/2025 | Chu et al. | |
| 2025/0193932 | A1 | 6/2025 | Chu et al. | |
| 2025/0203617 | A1 | 6/2025 | Chu et al. | |

* cited by examiner

*Primary Examiner* — Viral S Lakhia

(57) ABSTRACT

Embodiments of a method and apparatus for communications are disclosed. In an embodiment, a communications device includes a controller configured to generate a protected control frame using a key for integrity checking and a transceiver configured to transmit the protected control frame to a second communications device.

20 Claims, 9 Drawing Sheets

500

| TYPE VALUE B3 B2 | TYPE DESCRIPTION | SUBTYPE VALUE B7 B6 B5 B4 | SUBTYPE DESCRIPTION |
|---|---|---|---|
| 01 | CONTROL | 0000-001(11AX) | RESERVED |
| 01(11AX) | CONTROL | 0010 | TRIGGER |
| 01 | CONTROL | 0011 | TACK |
| 01 | CONTROL | 0100 | BEAMFORMING REPORT POLL |
| 01 | CONTROL | 0101 | (11AX)VHT/HE NDP ANNOUNCEMENT |
| 01 | CONTROL | 0110 | CONTROL FRAME EXTENSION |
| 01 | CONTROL | 0111 | CONTROL WRAPPER |
| 01 | CONTROL | 1000 | BLOCK ACK REQUEST (BlockAckReq) |
| 01 | CONTROL | 1001 | BLOCK ACK (BlockAck) |
| 01 | CONTROL | 1010 | PS-POLL |
| 01 | CONTROL | 1011 | RTS |
| 01 | CONTROL | 1100 | CTS |
| 01 | CONTROL | 1101 | ACK |
| 01 | CONTROL | 1110 | CF-END |
| 01 | CONTROL | 1111 | RESERVED |

ONE OF THE RESERVED SUBTYPE VALUE WITH CONTROL TYPE INDICATES THE EXTENDED CONTROL FRAME

FIG. 5

SYSTEM AND METHOD FOR FRAME PROTECTION

CROSS-REFERENCE TO RELATED APPLICATIONS

This application is entitled to the benefit of U.S. Provisional Patent Application Ser. No. 63/485,036, filed on Feb. 15, 2023 and U.S. Provisional Patent Application Ser. No. 63/487,722, filed on Mar. 1, 2023, the contents of which are incorporated by reference herein.

BACKGROUND

In multi-link communications, an access point (AP) multi-link device (MLD) transmits various types of information using different transmission techniques to a non-AP MLD. For example, a wireless AP MLD wirelessly transmits data to one or more wireless stations in a non-AP MLD through one or more wireless communications links. To facilitate the proper data transmission within a multi-link communications system, there is a need for multi-link communications technology that can efficiently and securely convey communications signaling information, for example, information related to data, communications links, and/or multi-link devices (e.g., operation and/or capability parameters of multi-link devices) within the multi-link communications system.

SUMMARY

Embodiments of a method and apparatus for communications are disclosed. In an embodiment, a communications device includes a controller configured to generate a protected control frame using a key for integrity checking and a transceiver configured to transmit the protected control frame to a second communications device. Other embodiments are also disclosed.

In an embodiment, the communications device includes a wireless device.

In an embodiment, the communications device includes a wireless MLD, the second communications device includes a second wireless MLD, and the transceiver includes a wireless transceiver configured to transmit the protected control frame to the second wireless MLD through a wireless link between the wireless MLD and the second wireless MLD.

In an embodiment, the protected control frame includes a unicast control frame, the key for integrity checking includes a pair-wise key, and the protected control frame is integrity checked by the second communications device.

In an embodiment, the pair-wise key includes a control frame peer transient key (CPTK).

In an embodiment, each link between the wireless MLD and the second wireless MLD has its own packet number (PN) space for unicast control frame protection.

In an embodiment, the CPTK is a MLD level key and is calculated using at least one of a Media Access Control (MAC) address of the wireless MLD and a MAC address of the second wireless MLD.

In an embodiment, the protected control frame includes a multicast or broadcast control frame, the key for integrity checking includes a group key, and the multicast or broadcast control frame is integrity checked by the second communications device.

In an embodiment, the group key includes a control frame group temporal key (CGTK).

In an embodiment, the group key owns a separate packet number (PN) space.

In an embodiment, a MAC header and a data field of the protected control frame before a message integrity check (MIC) field is clear text.

In an embodiment, packet number (PN) information, key identification (ID) information, and MIC information are carried in the protected control frame.

In an embodiment, the key for integrity checking is calculated based on an address or a Basic Service Set Identifier (BSSID of the communications device.

In an embodiment, the communications device includes a wireless access point (AP) or a non-AP station (STA).

In an embodiment, a wireless MLD includes a controller configured to generate a protected control frame using a transient key or a group key and a wireless transceiver configured to transmit the protected control frame to a second wireless MLD through a wireless link between the wireless MLD and the second wireless MLD. PN information, key ID information, and MIC information are carried in the protected control frame. The protected control frame is integrity checked by the second wireless MLD.

In an embodiment, a method for communications involves at a first communications device, generating a protected control frame using a key for integrity checking and from the first communications device, transmitting the protected control frame to a second communications device.

In an embodiment, the first communications device includes a first wireless MLD, and the second communications device includes a second wireless MLD.

In an embodiment, the protected control frame includes a unicast control frame, the key for integrity checking includes a pair-wise key, and the protected control frame is integrity checked by the second communications device.

In an embodiment, the protected control frame includes a multicast or broadcast control frame, the key for integrity checking includes a group key, and the multicast or broadcast control frame is integrity checked by the second communications device.

In an embodiment, PN information, key ID information, and MIC information are carried in the protected control frame.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 5 depicts an example subtype subfield value table.

Throughout the description, similar reference numbers may be used to identify similar elements.

DETAILED DESCRIPTION

Figure 1:
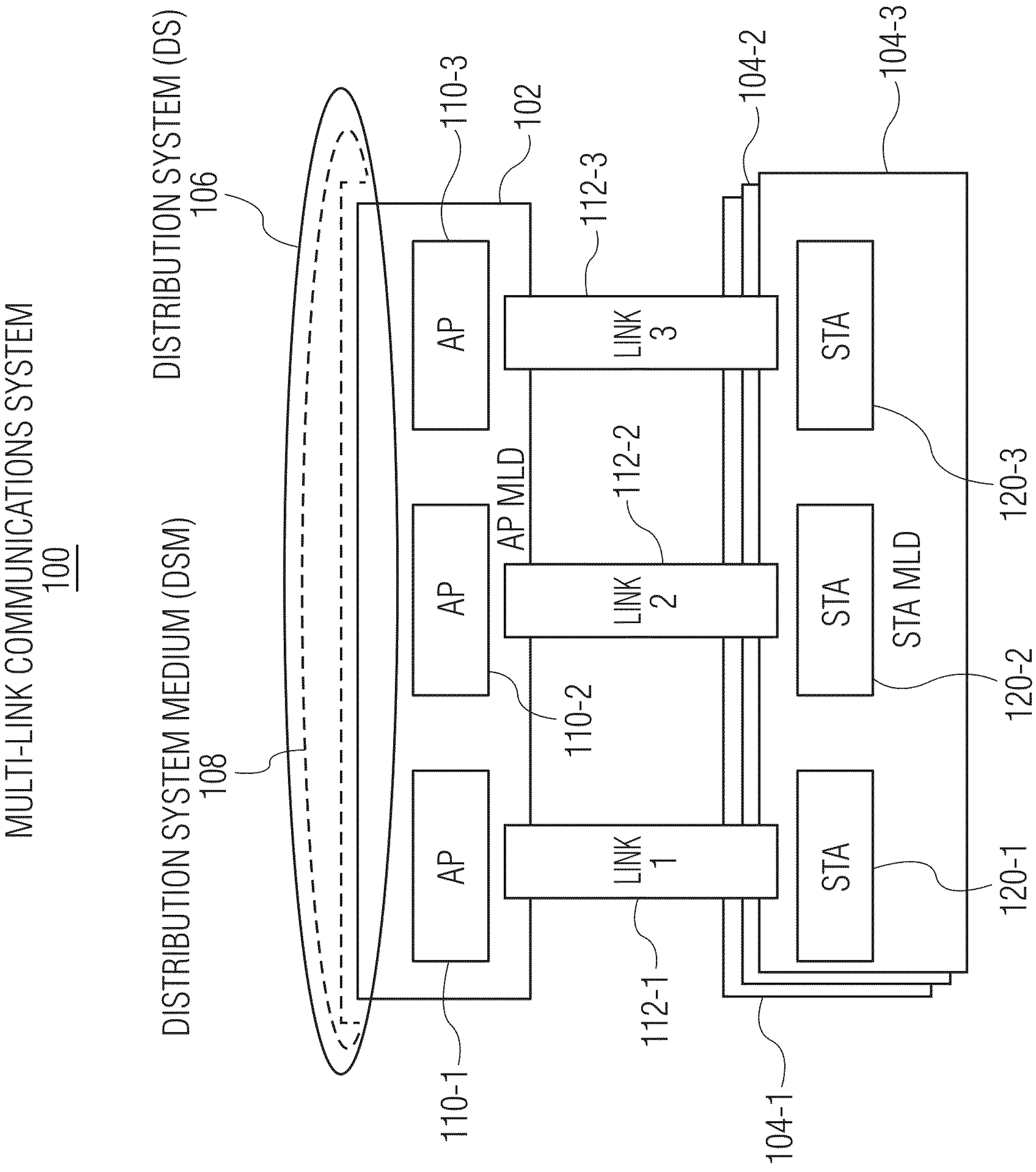
FIG. 1 depicts a multi-link communications system in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, a wireless device, e.g., an access point (AP) multi-link device (MLD) of a wireless local area network (WLAN) may transmit data to at least one associated station (STA) MLD. The AP MLD may be configured to operate with associated STA MLDs according to a communication protocol. For example, the communication protocol may be an Institute of Electrical and Electronics Engineer (IEEE) 802.11 communication protocol.

FIG. 1 depicts a multi-link (ML) communications system 100 in accordance with an embodiment of the invention. In the embodiment depicted in FIG. 1, the multi-link communications system includes at least one AP multi-link device (MLD) 102, and one or more non-AP multi-link devices, which are, for example, implemented as station (STA) MLDs 104-1, 104-2, 104-3. The multi-link communications system can be used in various applications, such as industrial applications, medical applications, computer applications, and/or consumer or appliance applications. In some embodiments, the multi-link communications system is a wireless communications system, such as a wireless communications system compatible with an Institute of Electrical and Electronics Engineers (IEEE) 802.11 protocol. Although the depicted multi-link communications system 100 is shown in FIG. 1 with certain components and described with certain functionality herein, other embodiments of the multi-link communications system 100 may include fewer or more components to implement the same, less, or more functionality. For example, although the multi-link communications system 100 is shown in FIG. 1 includes the AP MLD 102 and the STA MLDs 104-1, 104-2, 104-3, in other embodiments, the multi-link communications system includes other multi-link devices, such as, multiple AP MLDs and multiple STA MLDs, multiple AP MLDs and a single STA MLD, a single AP MLD and a single STA MLD. In another example, in some embodiments, the multi-link communications system includes more than three STA MLDs and/or less than three STA MLDs. In yet another example, although the multi-link communications system 100 is shown in FIG. 1 as being connected in a certain topology, the network topology of the multi-link communications system 100 is not limited to the topology shown in FIG. 1.

In the embodiment depicted in FIG. 1, the AP MLD 102 includes multiple radios, implemented as APs 110-1, 110-2, 110-3. In some embodiments, the AP MLD 102 is an AP multi-link logical device or an AP multi-link logical entity (MLLE). In some embodiments, a common part of the AP MLD 102 implements upper layer Media Access Control (MAC) functionalities (e.g., beaconing, association establishment, reordering of frames, etc.) and a link specific part of the AP MLD 102, i.e., the APs 110-1, 110-2, 110-3, implement lower layer MAC functionalities (e.g., backoff, frame transmission, frame reception, etc.). The APs 110-1, 110-2, 110-3 may be implemented in hardware (e.g., circuits), software, firmware, or a combination thereof. At least one of the APs 110-1, 110-2, 110-3 may be fully or partially implemented as an integrated circuit (IC) device. In some embodiments, the AP MLD and its affiliated APs 110-1, 110-2, 110-3 are compatible with at least one wireless local area network (WLAN) communications protocol (e.g., at least one IEEE 802.11 protocol). For example, the APs 110-1, 110-2, 110-3 may be wireless APs compatible with at least one WLAN communications protocol (e.g., at least one IEEE 802.11 protocol).

In some embodiments, an AP MLD (e.g., the AP MLD 102) is connected to a local network (e.g., a local area network (LAN)) and/or to a backbone network (e.g., the Internet) through a wired connection and wirelessly connects to wireless STAs, for example, through one or more WLAN communications protocols, such as an IEEE 802.11 protocol. In some embodiments, an AP (e.g., the AP 110-1, the AP 110-2, and/or the AP 110-3) includes at least one antenna, at least one transceiver operably connected to the at least one antenna, and at least one controller operably connected to the corresponding transceiver. In some embodiments, at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 110-1, 110-2, 110-3 of the AP MLD 104 operates in different frequency bands. For example, at least one of the APs 110-1, 110-2, 110-3 of the AP MLD 104 operates in a 2.4/5/6 Gigahertz (GHz) frequency band. For example, the AP 110-1 may operate at 6 Gigahertz (GHz) band (e.g., in a 320 MHz (one million hertz) Basic Service Set (BSS) operating channel or other suitable BSS operating channel), the AP 110-2 may operate at 5 GHz band (e.g., a 160 MHz BSS operating channel or other suitable BSS operating channel), and the AP 110-3 may operate at 2.4 GHz band (e.g., a 20 MHz BSS operating channel or other suitable BSS operating channel). In the embodiment depicted in FIG. 1, the AP MLD is connected to a distribution system (DS) 106 through a distribution system medium (DSM) 108. The distribution system (DS) 106 may be a wired network or a wireless network that is connected to a backbone network such as the Internet. The DSM 108 may be a wired medium (e.g., Ethernet cables, telephone network cables, or fiber optic cables) or a wireless medium (e.g., infrared, broadcast radio, cellular radio, or microwaves). Although the AP MLD 102 is shown in FIG. 1 as including three APs, other embodiments of the AP MLD 102 may include fewer than three APs or more than three APs. In addition, although some examples of the DSM 108 are described, the DSM 108 is not limited to the examples described herein.

In the embodiment depicted in FIG. 1, the STA MLD 104-1 includes radios, which are implemented as multiple non-AP stations (STAs) 120-1, 120-2, 120-3. The STAs 120-1, 120-2, 120-3 may be implemented in hardware (e.g., circuits), software, firmware, or a combination thereof. At least one of the STAs 120-1, 120-2, 120-3 may be fully or partially implemented as an IC device. In some embodiments, the non-AP STAs 120-1, 120-2, 120-3 are part of the STA MLD 104-1, such that the STA MLD may be a communications device that wirelessly connects to a wireless AP MLD, such as, the AP MLD 102. For example, the STA MLD 104-1 (e.g., at least one of the non-AP STAs 120-1, 120-2, 120-3) may be implemented in a laptop, a desktop personal computer (PC), a mobile phone, or other communications device that supports at least one WLAN communications protocol. In some embodiments, the STA MLD and its affiliated STAs 120-1, 120-2, 120-3 are compatible with at least one IEEE 802.11 protocol. In some embodiments, each of the non-AP STAs 120-1, 120-2, 120-3 includes at least one antenna, at least one transceiver operably connected to the at least one antenna, and at least one controller connected to the corresponding transceiver. In some embodiments, the at least one transceiver includes a PHY device. The at least one controller operably may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver. In some embodiments, the STA MLD has one MAC data service interface. In an embodiment, a single address is associated with the MAC data service interface and is used to communicate on the DSM 108. In some embodiments, the STA MLD 104-1 implements a common MAC data service interface and the non-AP STAs 120-1, 120-2, 120-3 implement a lower layer MAC data service interface. In some embodiments, the AP MLD 102 and/or the STA MLDs 104-1, 104-2, 104-3 identify which communications links support the multi-link operation during a multi-link operation setup phase and/or exchanges information regarding multi-link capabilities during the multi-link operation setup phase. Each of the STAs 120-1, 120-2, 120-3 of the STA MLD may operate in a different frequency band. For example, at least one of the STAs 120-1, 120-2, 120-3 of the STA MLD 104-1 operates in the 2.4/5/6 GHz frequency band. For example, the STA 120-1 may operate at 6 GHz band (e.g., in a 320 MHz (one million hertz) BSS operating channel or other suitable BSS operating channel), the STA 120-2 may operate at 5 GHz band (e.g., a 160 MHz BSS operating channel or other suitable BSS operating channel), and the STA 120-3 may operate at 2.4 GHz band (e.g., a 20 MHz BSS operating channel or other suitable BSS operating channel). Although the STA MLD 104-1 is shown in FIG. 1 as including three non-AP STAs, other embodiments of the STA MLD 104-1 may include fewer than three non-AP STAs or more than three non-AP STAs.

Each of the MLDs 104-2, 104-3 may be the same as or similar to the MLD 104-1. For example, the MLD 104-2 or 104-3 includes multiple non-AP STAs. In some embodiments, each of the non-AP STAs includes at least one antenna, at least one transceiver operably connected to the at least one antenna, and at least one controller connected to the corresponding transceiver. In some embodiments, the at least one transceiver includes a PHY device. The at least one controller operably may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 104-1 communicates with the AP MLD 102 through multiple communications links 112-1, 112-2, 112-3. For example, each of the STAs 120-1, 120-2, 120-3 communicates with an AP 110-1, 110-2, or 110-3 through a corresponding wireless communications link 112-1, 112-2, or 112-3. Although the AP MLD 102 communicates (e.g., wirelessly communicates) with the STA MLD 104-1 through multiple links 112-1, 112-2, 112-3, in other embodiments, the AP MLD 102 may communicate (e.g., wirelessly communicate) with the STA MLD through more than three communications links or less three than communications links. In some embodiments, the communications links in the multi-link communications system are wireless communications links, which may include one or more 2.4/5/6 GHz links.

In some implementations, a group-addressed trigger frame is protected by a group key with a key identification (ID) field, packet number (PN) field, message integrity check (MIC) field signaling inside the protected trigger frame. However, unicast control frames may be an issue when using a group key to protect them and the group frame protection method may not be safe. For protected block acknowledgement (PBA), the score context can be updated by Quality of service (QoS) Data frames in A-MPDU (Aggregated MAC Protocol Data Unit) whose decryptions are correct. However, it can be difficult for the recipient to update the scoreboard context with Short Interframe Space (SIFS). In addition, a third party device can retransmit the encrypted frame to cause the recipient to update its scoreboard context since the replay checking is after the reorder operation.

In some embodiments, protected control frame (e.g., key, packet number (PN) for control frame protection) are implemented. In some embodiment, whether or not a control frame is protected is explicitly indicated in the control frame. In some embodiments, the Protected Frame field of a control frame being equal to 1 indicates that the control frame is a protected Control frame. In some embodiments, the indication about whether a control frame is protected or not is carried in the frame body of the control frame. In some embodiments, a Block Ack Request (BAR) frame uses the reserved bit in the BAR Control field of the BAR frame to indicate whether the BAR frame is protected or not. In some embodiments, a Block Ack (BA) frame uses the reserved bit in the BA Control field of the BA frame to indicate whether the BA frame is protected or not. In some embodiments, a Trigger frame uses the reserved bit in the Special User Info field or the Common Info field of the Trigger frame to indicate whether the Trigger frame is protected or not. In some embodiments, the indication about whether a control frame is protected or not is implicitly indicated, e.g., the frame length of a BAR is longer than the BAR length defined by 802.11 protocol older than 802.11bn.

Some examples of Keys for protected control frame are described as follows. In some embodiments, for a unicast control frame, a new PTK is negotiated between an AP and its associated STA, e.g., a CPTK (Control frame peer transient key) for the unicast control frames protection between the AP and the STA. In some embodiments, a separate PN (e.g., a control frame packet number, CPN) space is used with the CPTK to provide control frame protection between the AP and the STA.

In some embodiments, for a broadcast control frame, a new group temporal key (GTK), e.g., a CGTK (Control frame broadcast transient key) is announced by an AP for protecting the broadcast control frames transmitted by the AP. In some embodiments, a separate PN (e.g., a broadcast control frame packet number, BCPN) space is used with a CGTK to protect broadcast control frames.

Some examples of per-link CPTK under MLD operation for protected unicast control frames are described as follows. In some embodiments, under MLD operation, for each link between the AP MLD and an associated non-AP MLD, the AP MLD and the associated non-AP MLD negotiate one CPTK for protecting the unicast control frames the AP MLD and the associated non-AP MLD on the link. In some embodiments, for each setup link, the link address of the non-AP MLD and the AP MLD's Basic Service Set Identifier (BSSID) in the link are used as the parameters for calculating the link specific key between the non-AP MLD and the AP MLD for the protected unicast control frames between non-AP MLD and the AP MLD on the setup link. In some embodiments, another variant is that the link ID is used to calculate the link specific key for the protected unicast control frame. In some embodiments, another variant is that the link ID and link addresses are not used to calculate the link specific key for the protected unicast control frame. In some embodiments, each link has its own dedicated PN space for per-link key of protected unicast control frame.

Some examples of MLD level CPTK under MLD operation for protected unicast control frames are described as follows. In some embodiments, under MLD operation, the AP MLD and the associated non-AP MLD (peer MLDs) negotiate MLD level CPTK for the protected unicast control frames between the AP MLD and the associated non-AP MLD on each setup link of the non-AP MLD with the AP MLD. In some embodiments, each link has its own dedicated PN space of protected unicast control frames between the AP MLD and the associated non-AP MLD on the link.

An existing control frame may be updated for control frame protection. In some embodiments, the protected control frame is the existing control frame with the added security information (e.g., CPN, Key ID, and message integrity check (MIC)). In some embodiments, the following fields are carried in a protected Control frame (e.g., a protected Block Acknowledgement Request (BAR)) besides the existing fields, if exists, of the related Control frame (e.g., a BAR) where the current control subtypes are used for the control frames being protected: CPN (control frame packet number), Key ID, MIC field. In some embodiments, the added fields are in frame body, e.g., one of the following:

- right after the last Address field;
- right before the frame check sequence (FCS) if the control frame doesn't include the padding field and right before the padding field if the control frame includes the padding field;
- with CPN, Key ID right after the last Address field and with MIC right before the FCS field if the control frame doesn't include the padding field, and with CPN, Key ID right after the last Address field and with MIC right before the padding field if the control frame includes the padding field;
- with Key ID right after the last Address field and with CPN and MIC right before the FCS field if the control frame doesn't include the padding field, and with Key ID right after the last Address field and with CPN and MIC right before the padding field if the control frame includes the padding field.

In some embodiments, the Protected Frame subfield in Frame Control field of the MAC header is used to indicate whether a Control frame is the protected control frame with the security encapsulation.

In some embodiment, at least the following control frames are protected: BAR frames, BA frames, Trigger frames.

Figure 2:
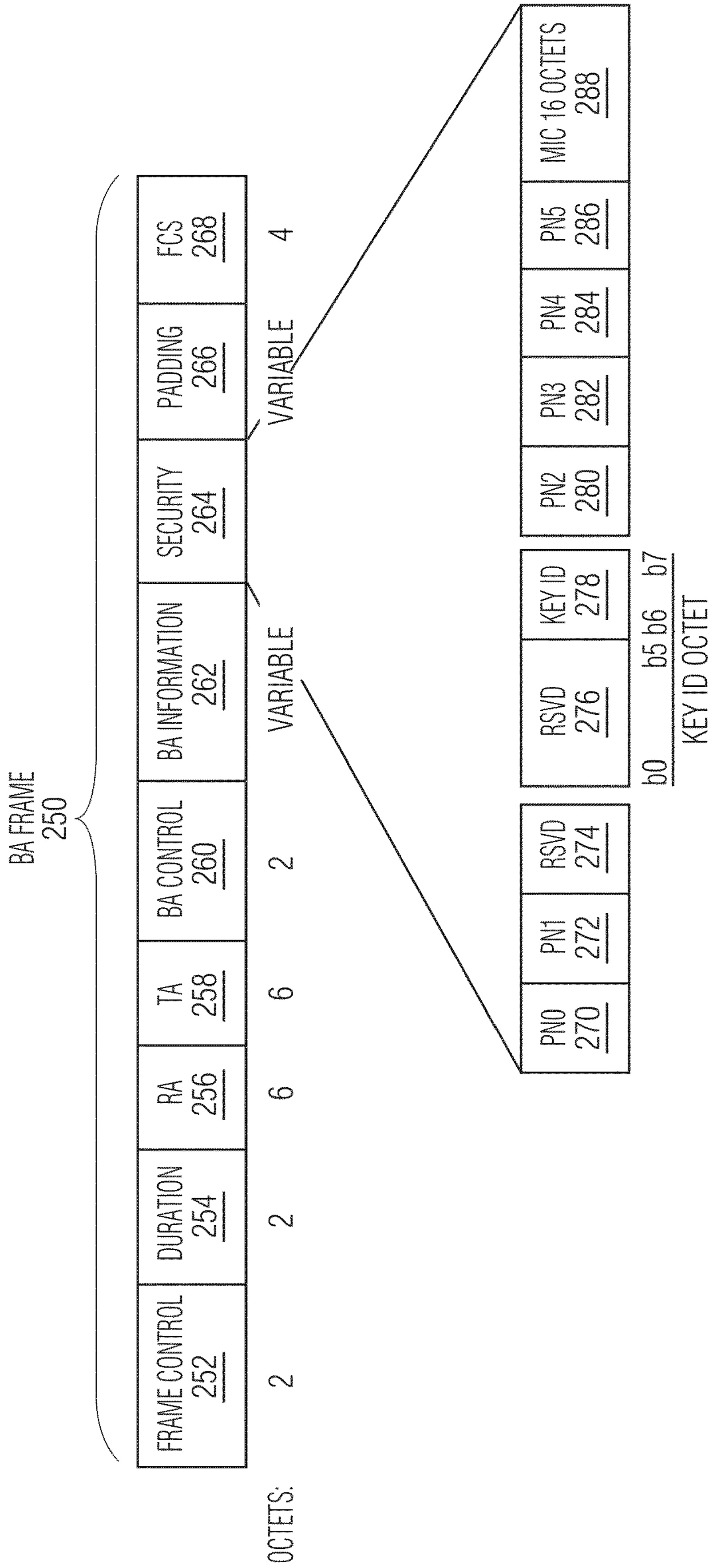
FIG. 2 illustrates a block acknowledgement (BA) frame format in accordance with an embodiment of the invention.

FIG. 2 illustrates a block acknowledgement (BA) frame format 250 in accordance with an embodiment of the invention. The BA frame format 250 illustrated in FIG. 2 may be used by the ML communications system 100 depicted in FIG. 1. In the embodiment depicted in FIG. 2, the BA frame format 250 includes a frame control field 252 (e.g., two-octet) that may contain frame control information, a frame duration field 254 (e.g., two-octet) that may contain frame duration information, a RA (receiver address or broadcast address) field 256 (e.g., six-octet) that may contain receiver address information, a TA (transmitter address) field 258 (e.g., six-octet) that may contain transmitter address information, a BA control field 260 (e.g., two-octet) that may contain BA control information, a BA information field 260 (e.g., variable length) that may contain BA information, a security field 262 that may contain security information, a padding field 266 (e.g., variable length) that may contain padding information, and a FCS field 268 (e.g., four-octet) that may contain frame check sequence (FCS) information. The security field 262 may include packet number fields PN0, PN1, PN2, PN3, PN4, PN5 270, 272, 274, 280, 282, 284, 286, a reserved (Rsvd) field 276, a key ID filed 278 that may contain key identification information, and a MIC field 288 (e.g., sixteen-octet) that may contain message integrity check (MIC) information. In some embodiments, the reserved (Rsvd) field 276 and the key ID filed 278 contain one octet of data. The BA frame format 250 reuses current BA frame design (e.g., same Subtype, etc.). CPN, Key ID and MIC (security parameters) are carried in the added security field 264 before the padding field 266 if exists. The 16-octet length of the MIC field 288 is an example. However, the other length, e.g., 8-octet MIC field, is also possible. In some embodiments, the other variant is that the MIC is not explicitly transmitted. However, when the protected control frame is transmitted, the FCS calculation assume that the MIC field is before the padding field. In some embodiments, the Key ID is carried in the BA Control field instead of putting PN, Key ID and MIC together, e.g., using the current reserved bits in BA Control field to carry the Key ID. In some embodiments, the control frame protection indication that indicates whether the BA frame is protected or not is carried in the BA Control field, e.g., using the current reserved bits in BA Control field to carry the control frame protection indication. In some embodiments, before the padding field, a pre-padding FCS is included where the MIC field is right before the pre-padding FCS field.

Figure 3:
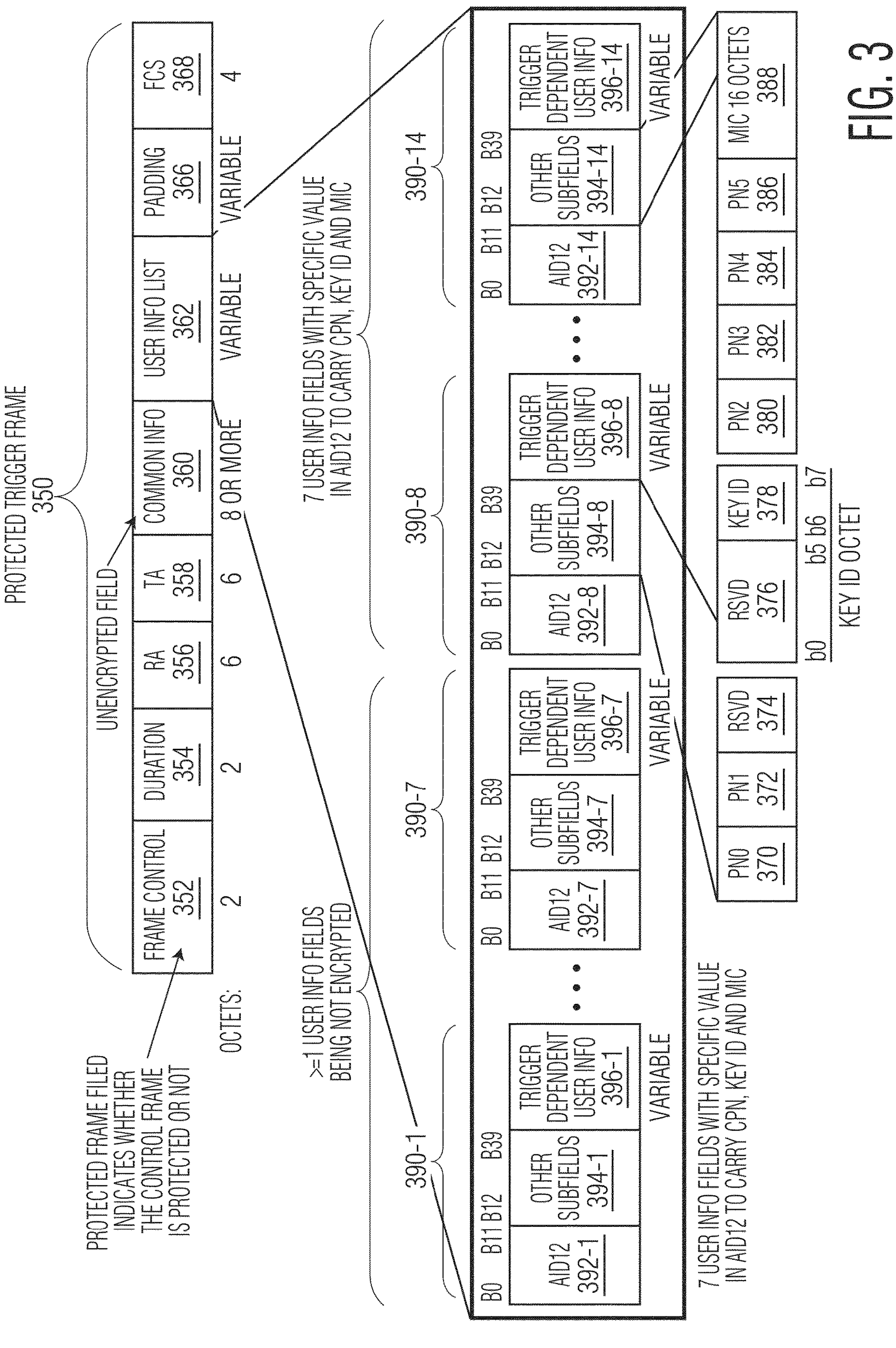
FIG. 3 illustrates a protected trigger frame format in accordance with an embodiment of the invention.

FIG. 3 illustrates a protected trigger frame format 350 in accordance with an embodiment of the invention. The protected trigger frame format 350 illustrated in FIG. 3 may be used by the ML communications system 100 depicted in FIG. 1. In the embodiment depicted in FIG. 3, the protected trigger frame format 350 includes a frame control field 352 (e.g., two-octet) that may contain frame control information (e.g., protected frame field indicates whether the control frame is protected or not], a frame duration field 354 (e.g., two-octet) that may contain frame duration information, a RA (receiver address or broadcast address) field 356 (e.g., six-octet) that may contain receiver address information, a TA (transmitter address) field 358 (e.g., six-octet) that may contain transmitter address information, a common information (info) field 360 (e.g., eight-octet or more) that may contain common information, a user information list field 362 (e.g., variable length) that may contain user information list with the first User Info field being the Special User Info field to carry PHY version, additional bandwidth (BW) information of the solicited TB PPDU, etc., a padding field 366 (e.g., variable length) that may contain padding information, and a FCS field 368 (e.g., four-octet) that may contain frame check sequence (FCS) information. The user information list field 362 may include multiple user info fields 390-1, . . . , 390-14, each of the multiple user info fields 390-1, . . . , 390-14 including an Association ID (AID) AID12 field 392-1, . . . , or 392-14 for carrying the AID value to identify 1) the addressed STA if the User Info field is addressed to a STA, 2) Special User Info field of PHY version, carry PHY version, Additional BW information of the solicited trigger based (TB) PPDU etc., 3) Security Special User Info field if the special User Info field carries the security parameters, other subfields 394-1, . . . , or 394-14, and an optional trigger dependent user info field 396-1, . . . , or 396-14 with variable length. For example, the other subfields 394-8 may include packet number fields PN0, PN1, PN2, PN3, PN4, PN5 370, 372, 374, 380, 382, 384, 386, a reserved (Rsvd) field 376, a key ID field 378 that may contain key identification information, and a MIC field 388 (e.g., sixteen-octet or 8-octet) that may contain message integrity check (MIC) information. In some embodiments, the reserved (Rsvd) field 376 and the key ID field 378 contain one octet of data. The protected trigger frame format 350 reuses current trigger frame design (e.g., the same Subtype, Trigger Type, Common/User Info field etc.). CPN, Key ID and MIC (security parameters) are carried in the User Info fields with specific value (e.g. a value less than 2007 such as 2006, or a value more than 2007, such as 2008) in AID12 field for carrying security parameters. In one embodiment, the specific AID value is allocated to associated STAs. In some embodiments, the Trigger Dependent User Info field in a User Info field with specific value in AID12 field for carrying security parameters is the same as in the Special User Info field whose AID12 field has value 2007. In some embodiments, the Trigger Dependent User Info field in the User Info field to carry the security parameters is not used to carry the security parameters. In some embodiments, the Trigger Dependent User Info field in the User Info field to carry the security parameters is used to carry the security parameters. The 16-octet length of the MIC field 388 is an example, the other length, e.g., 8-octet MIC field 388 is also possible. In some embodiments, the MIC is not explicitly transmitted. However, when the protected control frame is transmitted, the FCS calculation assume that the MIC field is before the padding field. When the protected control frame is received, the FCS calculation assume that the MIC field is before the padding field. In some embodiments, the Key ID is carried in the Special User Info field with value 2007 in its AID12 field at the beginning of User Info List instead of putting PN, Key ID and MIC together. In some embodiments, the Common Info field, the User Info field(s) that are not User Info fields with specific value in AID12 field for carrying security parameters do not carry cypher text, instead, they are used to calculate the MIC. In some embodiments, the MAC header or at least some field of the MAC header are used to calculate the MIC. In some embodiments, the reserved bits in Special User Info field with AID12 field equal to 2007 or the Common Info field is used to indicate whether the Trigger frame is protected.

In some embodiments, to decrease the responding time to process the protected Control frames, the control frame is integrity protected, e.g., by using Galois Message Authentication Code (GMAC)-256 for integrity protection, i.e., the MAC header and the Data part of the protected Control frame before MIC field is clear text. In some embodiments, the protected control frame is encrypted by the transmitter and decrypted by the recipient of the protected control frame. In some embodiments, the protected unicast control frames are encrypted by the transmitter and decrypted by the recipient of the protected control frame, and the protected broadcast control frames are protected by integrity protection.

In some embodiments, new control subtype can be used for control frame protection. In some embodiments, the protected control frame is the control frames with the new Control subtype. In some embodiments, the protected Control frame with the new control subtype encapsulates another control subtype whose frame body is encapsulated in the protected Control frame. For example, if a protected Control frame is used to replace BAR to solicit BA, the protected Control frame has the new control subtype and includes that BAR's control subtype in its frame body, and includes the data part of the BAR frame in the frame body of the protected Control frame. Additionally, the protected Control frame with the new Control Subtype carries:

CPN (control frame packet number);
Key ID;
MIC field.

The added fields are in frame body, e.g., one of the following:

right after the last Address field;
right before the frame check sequence (FCS) if the control frame doesn't include the padding field and right before the padding field if the control frame includes the padding field;

with CPN, Key ID right after the last Address field and with MIC right before the FCS field if the control frame doesn't include the padding field, and with CPN, Key ID right after the last Address field and with MIC right before the padding field if the control frame includes the padding field;

with Key ID right after the last Address field and with CPN and MIC right before the FCS field if the control frame doesn't include the padding field, and with Key ID right after the last Address field and with CPN and MIC right before the padding field if the control frame includes the padding field.

Figure 4:
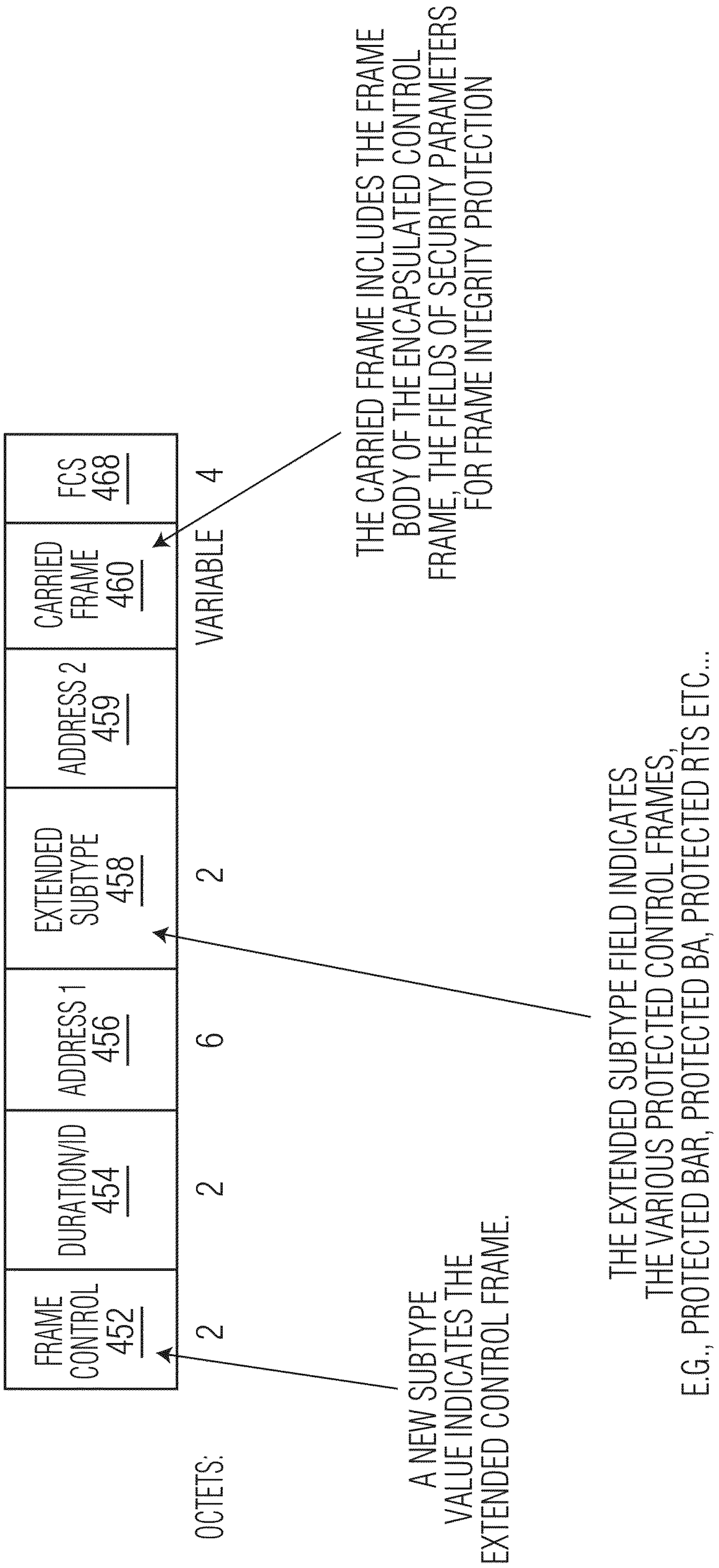
FIG. 4 illustrates a protected control frame format in accordance with an embodiment of the invention.

FIG. 4 illustrates a protected control frame format 450 in accordance with an embodiment of the invention. The protected control frame format 450 illustrated in FIG. 4 may be used by the ML communications system 100 depicted in FIG. 1. In the embodiment depicted in FIG. 4, the protected control frame format 450 includes a frame control field 452 (e.g., two-octet) that may contain frame control information whose Type subfield and Subtype subfield indicate a new defined control subtype (i.e., the control frame has the new control subtype), a frame duration/ID field 454 (e.g., two-octet) that may contain frame duration information or ID information, an address field 456 (e.g., six-octet) that may contain address information, an extended subtype field 458 (e.g., two-octet) that may contain extended subtype information to indicate that the control frame is the protected control frame and the subtype of the encapsulated control frame (e.g., 4-bit 1000 for encapsulated BAR, 4-bit 0010 for encapsulated Trigger), an optional addresses 2 field 459 between the extended subtype field 458 and a carried frame field 460, the carried frame field 460 (e.g., variable length) that may contain carried frame information of the encapsulated control frame and security parameters, and a FCS field 468 (e.g., four-octet) that may contain frame check sequence (FCS) information. In some embodiments, the frame control field 452 contains a new Subtype value, which indicates the Extended Control frame. In some embodiments, the extended Subtype field 458 contains data that indicates the various Protected Control frames, e.g., Protected BAR, Protected BA, Protected Request To Send (RTS), etc. In some embodiments, the carried frame field 460 includes the specific frame information of the various Extended Subtype values, e.g., fields related to the various Extended Subtype values, fields for frame encryption/decryption.

FIG. 5 depicts an example subtype subfield value table 500. In the example subtype subfield value table 500 depicted in FIG. 5, type values, type description information, subtype values, and subtype description information are listed. In some embodiments, one of the reserved Subtype value with Control Type indicates the Extended Control frame.

In some embodiments, one of the following methods can be used to indicate the security encapsulation of a protected unicast control frame other than a Trigger frame. In some embodiments, one of the following methods can be used to indicate the security encapsulation of a protected control frame that includes a Trigger frame. In one embodiment, the Protected Frame field in Frame Control field indicates whether the control frame is protected. In one embodiment, the reserved bits in various control frames indicate whether the related control frames are protected. In some embodiments, a new Subtype of Control Type indicate the security encapsulation and the Extended Subtype further indicates the encapsulated control frame, e.g., Trigger, BAR, BA, etc.

Figure 6:
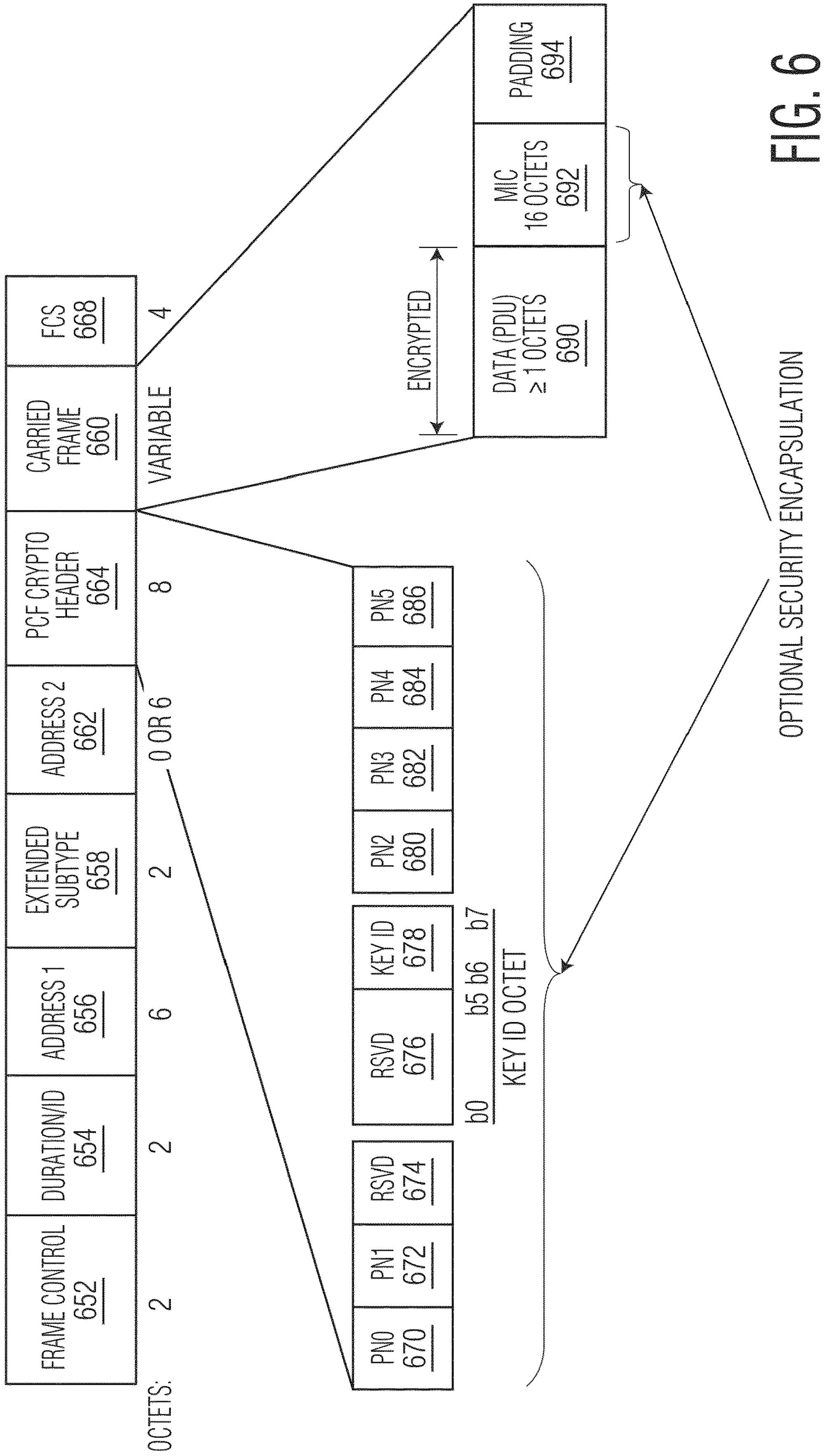
FIG. 6 illustrates a protected control frame format in accordance with an embodiment of the invention.

FIG. 6 illustrates a protected control frame format 650 in accordance with an embodiment of the invention. The protected control frame format 650 illustrated in FIG. 6 may be used by the ML communications system 100 depicted in FIG. 1. In the embodiment depicted in FIG. 6, the protected control frame format 650 includes a frame control field 652 (e.g., two-octet) that may contain frame control information whose Type and Subtype subfield indicate the existence of the extended subtype field after the address field 656, a frame duration/ID field 654 (e.g., two-octet) that may contain frame duration information or ID information, an address field 656 (e.g., six-octet) that may contain address information, an extended subtype field 658 (e.g., two-octet) that may contain extended subtype information and the control subtype whose frame content (DATA field 690) being protected is carried in the frame body, an address field 662 (e.g., zero-octet or six-octet) that may contain address information, a Protected Control Frame (PCF) Crypto Header field 664 (e.g., eight-octet) that may contain PCF crypto header information, a carried frame field 660 (e.g., variable length) that may contain carried frame information, and a FCS field 668 (e.g., four-octet) that may contain frame check sequence (FCS) information. The PCF crypto header field 664 and the carried frame field 660 can be used for optional security encapsulation. In some embodiments, the PCF crypto header field 664 includes packet number fields PN0, PN1, PN2, PN3, PN4, PN5 670, 672, 674, 680, 682, 684, 686, a reserved (Rsvd) field 676, and a key ID filed 678 that may contain key identification information. In some embodiments, the reserved (Rsvd) field 676 and the key ID filed 678 contain one octet of data. In some embodiments, the carried frame field 660 includes a data (Protocol Data Unit (PDU) field 690 that is the frame body of the encapsulated control frame, a MIC field 692 (e.g., sixteen-octet) that may contain message integrity check (MIC) information, and a padding filed 694 that may contain padding information. In some embodiments, the frame control field 652 contains a new Subtype value, which indicates the Extended Control frame. In some embodiments, the extended Subtype field 658 contains data that indicates the various Protected Control frames being encapsulated, e.g., Protected BAR, Protected BA, Protected Trigger, etc. In some embodiments, the carried frame field 660 includes the specific frame information of the various Extended Subtype values, e.g., fields related to the various Extended Subtype values, fields for frame encryption/decryption.

In some embodiments, a unicast control frame other than a trigger frame is protected. In some embodiments, security encapsulation is implemented by grouping the crypto cipher initial vector (CPN, Key ID) into a new field (e.g., Protected Control Frame (PCF) Crypto Header 664), which can be placed as the first field after Control Frame MAC header, and encapsulating crypto cipher MIC into a new Special MIC User Info field. The 16-octet length of the MIC field 692 is an example, the other length (e.g., 8-octet MIC field 692) is also possible. In some embodiments, the MIC is not explicitly transmitted. However, when the protected control frame is transmitted, the FCS calculation assume that the MIC field is before the padding field. When the protected control frame is received, the FCS calculation assume that the MIC field is before the padding field. In some embodiments, the Data field 690 is the payload of the encapsulated control frame, which is integrity protected at the transmitter of the frame, and is integrity checked by the recipient. For example, for encapsulated BAR, the Data field includes BA Control, BA Information. In some embodiments, for a frame without payload (e.g., an Ack frame), a dummy field (e.g., 1-octet field) is added in Data field whose content is encrypted/decrypted. In some embodiments, the start bit of the Padding field is decided by the Extended Subtype. In some embodiments, another variant is to have an explicit indication field, e.g., the length of the frame until the last MIC bit. In some embodiments, the Data field is encrypted by the transmitter and decrypted by the recipient.

It may be difficult for some devices to perform the integrity check, replay checking, and sending response with SIFS inter-frame space after receiving the protected soliciting Control frame. In some embodiments, a first STA/AP announces its additional processing time requirement in order to send the response with SIFS inter-frame space after performing the integrity and replay checking of the received protected control frame(s). In some embodiments, when a second AP/STA transmits frame(s) in a PPDU to the first STA/AP, the padding after the last bit in the PPDU requiring the integrity checking and replay checking needs to be longer enough than the additional processing time requirement. The padding can be one of the following:

MAC padding;

MAC padding of End of Frame (EoF) padding within Very High Throughput (VHT), High Efficiency (HE), Extremely High Throughput (EHT), Ultra High Reliability (UHR) PPDU;

QoS Null frame(s) after the last frame that requires the decryption and replay check.

In some embodiments, for protected BA (PBA), the score context is updated by the QoS Data frames in A-MPDU whose decryptions are correct and replay checking are correct. In some embodiments, the lower layer MAC maintains the lower-layer replay counter of each PBA agreement. In some embodiments, if the following are true for the received A-MPDU of PBA agreement, each received frame are used to update the scoreboard context and the replay counter are updated: the received frame can by decrypted correctly or the PN of the received frame is no less than the lower layer replay counter. In some embodiments, after the A-MPDU processing, the lower-layer replay counter of the PBA agreement is set to the PN of the QoS Data frame with the largest Sequence Number where all the QoS Data frames within the Scoreboard context window with the Sequence Numbers less than the largest Sequence Numbers are correctly received and decrypted. For Full-state vs partial state scoreboard context, a first option is partial state scoreboard context under MLD operation with local/independent full-state scoreboard context in each link Under MLD, either partial-state or full-state scoreboard context in other cases, while a second option is Full state scoreboard context. In some embodiments, under the operation with local/independent full-state scoreboard context in each link, when the up-layer replay checking after reorder buffering is done for a received A-MPDU and the replay counter of the BA agreement is changed, the updated up-layer replay counter is used to update the lower-layer replay counter.

Under PBA, the BAR may not be used for updating the reorder buffer (e.g., WinStartB). Instead, the protected Add Block Ack Response (ADDBA) Request is used to update the reorder buffer. With long processing time of protected Management frame, the mechanism may not work correctly. In some embodiments, with protected Control frame, the encrypted BAR is used to update the reorder buffer (WinStartB). In some embodiments, without protected Control frame, the ADDBA is not used to update the reorder buffer. Instead, only the QoS Data frames are used to update the reorder buffer. In some embodiments, the protected ADDBA Request and ADDBA Response are used by the recipient to synchronize its reorder buffer and the originator's WinStartO. In some embodiments, before receiving ADDBA Response, the originator (the transmitter of ADDBA Request) is not allowed to transmit the A-MPDU of the BA agreement. In some embodiments, the recipient of ADDBA Request (Recipient) provides the time that is required by it to process the ADDBA and update the reorder buffer, scoreboard context. In some embodiments, before time out of the timer with initial value being set to the time announced by the Recipient right after the Ack solicited by ADDBA Request is received, the originator (the transmitter of ADDBA Request) is not allowed to transmit the A-MPDU of the BA agreement.

Figure 7:
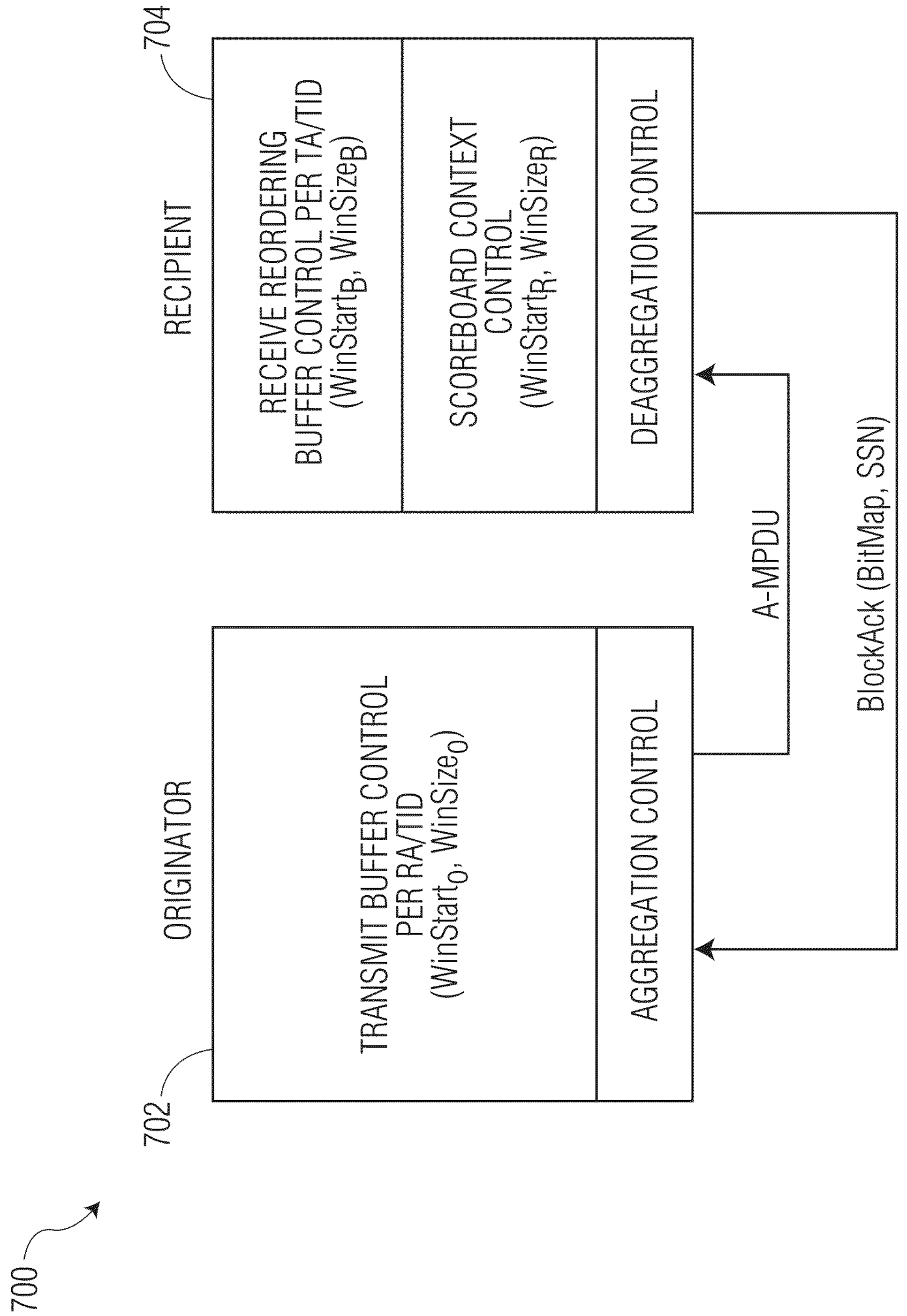
FIG. 7 depicts an example block acknowledgement (ACK) architecture.

FIG. 7 depicts an example block ACK architecture 700. In the embodiment depicted in FIG. 7, the block ACK architecture 700 includes an originator 702 and a recipient 704. In some embodiments, the originator 702 transmits buffer control per RA/Traffic Identifier (TID) to the recipient 704, which performs scoreboard context control. The originator 702 may perform aggregation control by transmitting A-MPDU to the recipient 704, which may perform deaggregation control by transmitting blockACK (bitmap, Starting Sequence number (SSN)).

Figure 8:
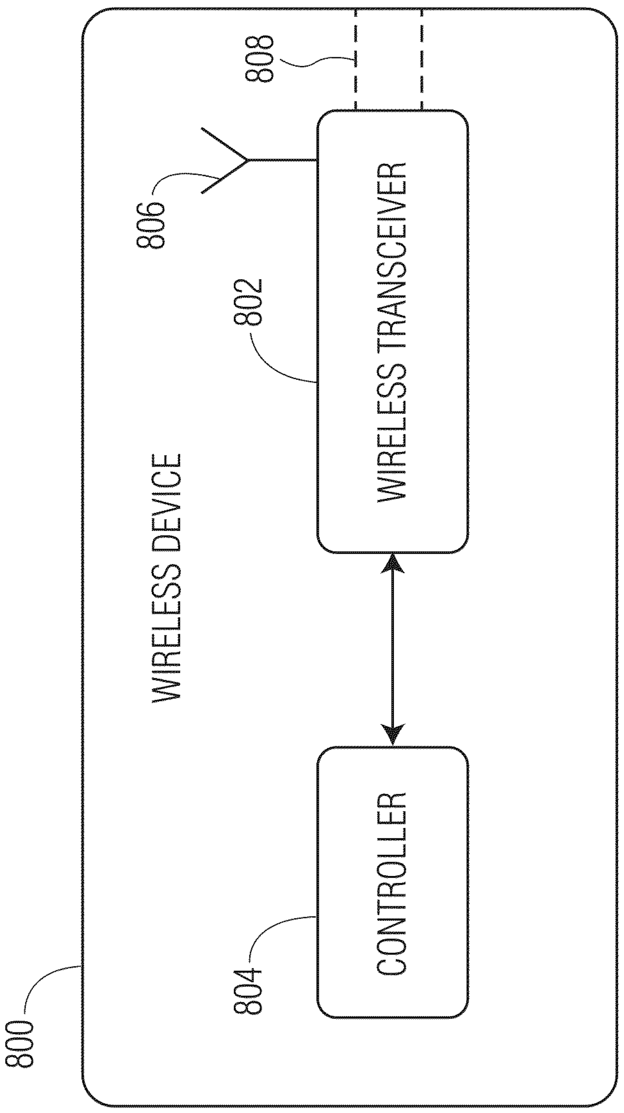
FIG. 8 depicts a wireless device in accordance with an embodiment of the invention.

FIG. 8 depicts a wireless device 800 in accordance with an embodiment of the invention. The wireless device 800 can be used in the multi-link communications system 100 depicted in FIG. 1. For example, the wireless device 800 may be an embodiment of the APs 110-1, 110-2, 110-3 or the STAs 120-1, 120-2, 120-3 depicted in FIG. 1. However, the APs 110-1, 110-2, 110-3 or the STAs 120-1, 120-2, 120-3 depicted in FIG. 1 are not limited to the embodiment depicted in FIG. 8. In the embodiment depicted in FIG. 8, the wireless device 800 includes a wireless transceiver 802, a controller 804 operably connected to the wireless transceiver, and at least one antenna 806 operably connected to the wireless transceiver. In some embodiments, the wireless device 800 may include at least one optional network port 808 operably connected to the wireless transceiver. In some embodiments, the wireless transceiver includes a physical layer (PHY) device. The wireless transceiver may be any suitable type of wireless transceiver. For example, the wireless transceiver may be a LAN transceiver (e.g., a transceiver compatible with an IEEE 802.11 protocol). In some embodiments, the wireless device 800 includes multiple transceivers. The controller may be configured to control the wireless transceiver to process packets received through the antenna and/or the network port and/or to generate outgoing packets to be transmitted through the antenna and/or the network port. In some embodiments, the controller is implemented within a processor, such as a microcontroller, a host processor, a host, a DSP, or a CPU. The antenna may be any suitable type of antenna. For example, the antenna may be an induction type antenna such as a loop antenna or any other suitable type of induction type antenna. However, the antenna is not limited to an induction type antenna. The network port may be any suitable type of port. The wireless device 800 may be compatible with an IEEE 802.11 protocol.

In accordance with an embodiment of the invention, the controller 804 is configured to generate a protected control frame using a key for integrity checking and the transceiver 802 is configured to transmit the protected control frame to a second communications device. In some embodiments, the wireless device 800 includes a wireless multi-link device (MLD), the second communications device includes a second wireless MLD, and the transceiver is configured to transmit the protected control frame to the second wireless MLD through a wireless link between the wireless MLD and the second wireless MLD. In some embodiments, the protected control frame includes a unicast control frame, the key includes a pair-wise key, and the protected control frame is integrity checked by the second communications device. In some embodiments, the pair-wise key includes a CPTK (Control frame peer transient key). In some embodiments, the pair-wise key owns a separate packet number (PN) space. In some embodiments, the unicast control frame is individual-addressed. In some embodiments, each link between the wireless MLD and the second wireless MLD has its own packet number (PN) space for unicast control frame protection. In some embodiments, the CPTK is a MLD level key and is calculated using at least one of a Media Access Control (MAC) address of the wireless MLD and a MAC address of the second wireless MLD. In some embodiments, the protected control frame includes a multicast or broadcast control frame, the key includes a group key, and the multicast or broadcast control frame is integrity checked by the second communications device. In some embodiments, the group key includes a CGTK (control frame group temporal key). In some embodiments, the group key owns a separate packet number (PN) space. In some embodiments, a Media Access Control (MAC) header and a data field of the protected control frame before a message integrity check (MIC) field is clear text. In some embodiments, packet number (PN) information, key identification (ID) information, and message integrity check (MIC) information are carried in the encrypted control frame. In some embodiments, the key for integrity checking is calculated based on an address or a Basic Service Set Identifier (BSSID of the communications device. In some embodiments, the wireless device 800 includes a wireless access point (AP) or a non-AP station (STA).

Figure 9:
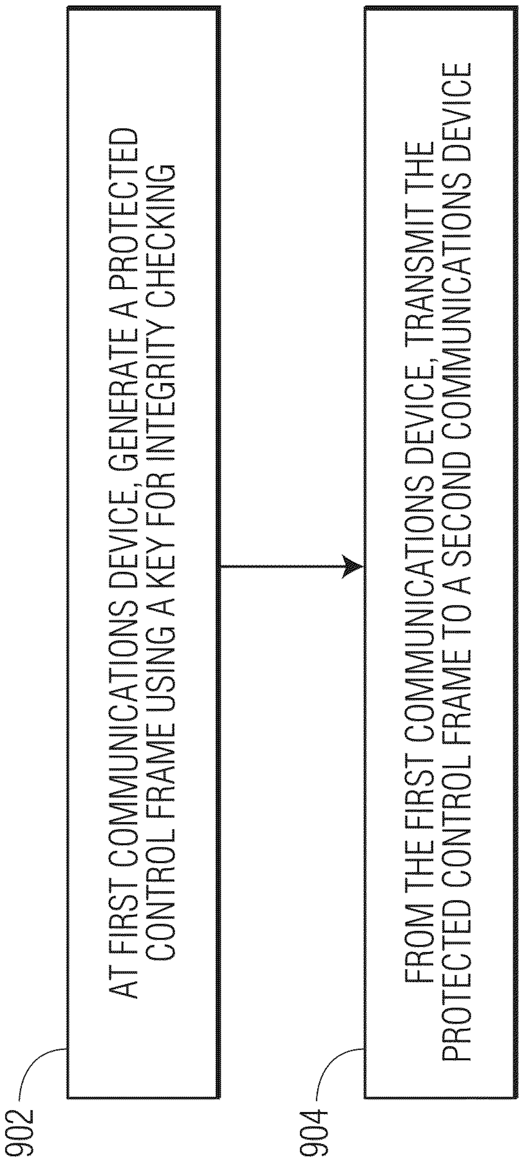
FIG. 9 is a process flow diagram of a method for communications in accordance with an embodiment of the invention.

FIG. 9 is a process flow diagram of a method for communications in accordance with an embodiment of the invention. At block 902, at a first communications device, a protected control frame is generated using a key for integrity protection. At block 904, from the first communications device, the protected control frame is transmitted to a second communications device. In some embodiments, the first communications device includes a first wireless multi-link device (MLD), and the second communications device includes a second wireless MLD. In some embodiments, the protected control frame includes a unicast control frame, the key for integrity protection includes a pair-wise key, and the protected control frame is integrity checked by the second communications device. In some embodiments, the protected control frame includes a multicast or broadcast control frame, the key for integrity protection includes a group key, and the multicast or broadcast control frame is integrity checked by the second communications device. In some embodiments, packet number (PN) information, key identification (ID) information, and message integrity check (MIC) information are carried in the protected control frame. In some embodiments, the first communications device and the second communications device are compatible with an Institute of Electrical and Electronics Engineers (IEEE) 802.11 protocol. The first communications device and/or the second communications device may be the same as, similar to, a component of, or include the AP MLD 102 depicted in FIG. 1 the non-AP MLD 104-1, 104-2, or 104-3 depicted in FIG. 1, the APs 110-1, 110-2, 110-3, and/or the STAs 120-1, 120-2, 120-3 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A communications device comprising:

a controller configured to generate a protected control frame using a key for integrity checking, wherein the protected control frame comprises a frame control field that contains a frame protection indication; and a transceiver configured to transmit the protected control frame to a second communications device, wherein the communications device comprises a wireless multi-link device (MLD), wherein the second communications device comprises a second wireless MLD, and wherein the transceiver comprises a wireless transceiver configured to transmit the protected control frame to the second wireless MLD through a wireless link between the wireless MLD and the second wireless MLD.

2. The communications device of claim 1, wherein the protected control frame comprises a unicast control frame, wherein the key for integrity checking comprises a pair-wise key, and wherein the protected control frame is integrity checked by the second communications device.

3. The communications device of claim 2, wherein the pair-wise key comprises a control frame peer transient key (CPTK).

4. The communications device of claim 3, wherein each link between the wireless MLD and the second wireless MLD has its own packet number (PN) space for unicast control frame protection.

5. The communications device of claim 3, wherein the CPTK is a MLD level key and is calculated using at least one of a Media Access Control (MAC) address of the wireless MLD and a MAC address of the second wireless MLD.

6. The communications device of claim 1, wherein the protected control frame comprises a multicast or broadcast control frame, wherein the key for integrity checking comprises a group key, and wherein the multicast or broadcast control frame is integrity checked by the second communications device.

7. The communications device of claim 6, wherein the group key comprises control frame group temporal key (CGTK).

8. The communications device of claim 6, wherein the group key owns a separate packet number (PN) space.

9. The communications device of claim 1, wherein a Media Access Control (MAC) header and a data field of the protected control frame before a message integrity check (MIC) field is clear text.

10. The communications device of claim 1, wherein packet number (PN) information, key identification (ID) information, and message integrity check (MIC) information are carried in the protected control frame.

11. The communications device of claim 1, wherein the key for integrity checking is calculated based on an address or a Basic Service Set Identifier (BSSID of the communications device.

12. The communications device of claim 1, wherein the communications device comprises a wireless access point (AP) or a non-AP station (STA).

13. A method for communications, the method comprising:

at a first communications device, generating a protected control frame using a key for integrity checking, wherein the protected control frame comprises a frame control field that contains a frame protection indication; and from the first communications device, transmitting the protected control frame to a second communications device, wherein the first communications device comprises a first wireless multi-link device (MLD), wherein the second communications device comprises a second wireless MLD, and wherein transmitting the protected control frame to the second communications device comprises transmitting the protected control frame to the second wireless MLD through a wireless link between the first wireless MLD and the second wireless MLD.

14. The method of claim 13, wherein the protected control frame comprises a unicast control frame, wherein the key for integrity checking comprises a pair-wise key, and wherein the protected control frame is integrity checked by the second communications device.

15. The method of claim 13, wherein the protected control frame comprises a multicast or broadcast control frame, wherein the key for integrity checking comprises a group key, and wherein the multicast or broadcast control frame is integrity checked by the second communications device.

16. The method of claim 13, wherein packet number (PN) information, key identification (ID) information, and message integrity check (MIC) information are carried in the protected control frame.

17. The method of claim 14, wherein the pair-wise key owns a separate packet number (PN) space.

18. The method of claim 14, wherein the unicast control frame is individual-addressed.

19. The method of claim 15, wherein the group key owns a separate packet number (PN) space.

20. The method of claim 15, wherein the broadcast control frame is group-addressed.

* * * * *